US012753717B2

(12) United States Patent
Gruber et al.

(10) Patent No.: US 12,753,717 B2
(45) Date of Patent: Oct. 6, 2026

(54) INTERNAL COMBUSTION ENGINE WITH COMBUSTION PRE-CHAMBER

(71) Applicant: BRP-ROTAX GMBH & CO. KG, Gunskirchen (AT)

(72) Inventors: Thomas Gruber, Gangkofen (DE); Heinz Kusel, Pennewang (AT); Claudio Hoff, Sattledt (AT); Christian Stiebinger, Buchkirchen (AT); Thomas Zorn, Stadl-Paura (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 18/819,482

(22) Filed: Aug. 29, 2024

(65) Prior Publication Data

US 2025/0075654 A1 Mar. 6, 2025

Related U.S. Application Data

(60) Provisional application No. 63/535,787, filed on Aug. 31, 2023.

(51) Int. Cl.
*F02B 19/10* (2006.01)
*F01P 3/02* (2006.01)
(Continued)

(52) U.S. Cl.
CPC ................ *F02B 19/12* (2013.01); *F01P 3/02* (2013.01); *F02P 15/00* (2013.01); *F01P 2003/024* (2013.01)

(58) Field of Classification Search
CPC ..... F02B 19/108; F02B 19/1028; F02B 19/12
See application file for complete search history.

(56) References Cited

U.S. PATENT DOCUMENTS 4,019,473 A * 4/1977 Kamiya .................. F02B 19/10 123/275
5,979,387 A * 11/1999 Strait ...................... H01T 13/08 123/169 PA (Continued)

FOREIGN PATENT DOCUMENTS

CN 106103933 A * 11/2016 .......... F02B 19/1004
CN 113795655 A * 12/2021 .............. F02B 19/02

(Continued)

*Primary Examiner* — George C Jin
*Assistant Examiner* — Teuta B Holbrook
(74) *Attorney, Agent, or Firm* — BCF LLP

(57) ABSTRACT

An internal combustion engine having: a cylinder block defining a cylinder; a cylinder head defining a seat; a piston; a crankshaft, the piston, cylinder, and cylinder head defining a variable volume combustion chamber therebetween; an air intake passage; an exhaust passage; a fuel injector; and a combustion pre-chamber housing connected to the cylinder head and extending in part into the combustion chamber. The housing has: a tapering portion; and a tip connected to the tapering portion. The tapering portion abuts the seat. The tapering portion tapers toward the tip. The seat and the tapering portion of the housing have corresponding shapes. The housing defines: a combustion pre-chamber; and at least one orifice fluidly communicating the combustion pre-chamber with the combustion chamber. A spring biases the tapering portion of the housing against the seat of the cylinder head. A spark plug is connected to the combustion pre-chamber housing.

18 Claims, 14 Drawing Sheets

(51) Int. Cl.

| | |
|---|---|
| ***F02B 19/12*** | (2006.01) |
| ***F02P 15/00*** | (2006.01) |

(56) References Cited

U.S. PATENT DOCUMENTS

| | | | | |
|---|---|---|---|---|
| 8,839,762 | B1 * | 9/2014 | Chiera | F02B 19/12 123/266 |
| 9,217,360 | B2 * | 12/2015 | Pierz | F02B 19/1009 |
| 10,612,454 | B2 | 4/2020 | Bedogni et al. | |
| 2004/0020457 | A1 * | 2/2004 | Regueiro | F02B 23/0669 123/276 |
| 2007/0175451 | A1 * | 8/2007 | Beardmore | F02M 61/14 123/470 |
| 2008/0271713 | A1 * | 11/2008 | Morris | F02M 61/14 123/470 |
| 2011/0146618 | A1 * | 6/2011 | LaPointe | F02B 19/12 123/266 |
| 2015/0040845 | A1 * | 2/2015 | Chiera | F02P 13/00 123/445 |
| 2015/0083070 | A1 * | 3/2015 | Becker | F02B 19/16 123/254 |
| 2016/0024995 | A1 * | 1/2016 | Trinkel | F02M 21/0275 123/260 |
| 2016/0319791 | A1 * | 11/2016 | Willi | F02M 61/168 |
| 2016/0333771 | A1 * | 11/2016 | Willi | F02B 19/1009 |
| 2016/0348570 | A1 * | 12/2016 | Willi | F02B 19/12 |
| 2018/0149125 | A1 | 5/2018 | Ting et al. | |
| 2019/0203636 | A1 | 7/2019 | Endo et al. | |
| 2019/0376486 | A1 * | 12/2019 | Shah | H01T 13/58 |
| 2020/0362750 | A1 * | 11/2020 | Rabhi | F02B 19/18 |
| 2021/0355860 | A1 * | 11/2021 | Lejon | F02B 19/1023 |
| 2021/0388777 | A1 * | 12/2021 | Light-Holets | F02D 41/2429 |
| 2023/0073185 | A1 * | 3/2023 | Bertsch | F02P 13/00 |
| 2023/0175426 | A1 * | 6/2023 | Harada | F02B 19/108 123/299 |

FOREIGN PATENT DOCUMENTS

| | | | | | |
|---|---|---|---|---|---|
| DE | 3531570 | A | * | 3/1987 | F02B 19/12 |
| DE | 102019111091 | B3 | | 7/2020 | |
| DE | 102021104084 | A1 | | 8/2022 | |
| EP | 3521585 | A1 | * | 8/2019 | F01P 3/02 |
| FI | 125706 | B | * | 1/2016 | |
| WO | 2016025746 | A1 | | 2/2016 | |
| WO | WO-2022027076 | A1 | * | 2/2022 | F01P 3/16 |

* cited by examiner

INTERNAL COMBUSTION ENGINE WITH COMBUSTION PRE-CHAMBER

CROSS-REFERENCE

The present application claims priority from U.S. Provisional Patent Application No. 63/535,787, filed Aug. 31, 2023, the entirety of which is incorporated herein by reference.

TECHNICAL FIELD

The present technology relates to internal combustion engines with combustion pre-chambers.

BACKGROUND

Internal combustion engines conventionally define at least one combustion chamber in which fuel and air are introduced to form an air-fuel mixture. The air-fuel mixture is ignited by a spark plug.

Some internal combustion engines are provided with a combustion pre-chamber housing defining a combustion pre-chamber. The combustion pre-chamber housing extends in the combustion chamber. The spark plug extends in the combustion pre-chamber. The combustion pre-chamber housing defines orifices that fluidly communicate the combustion pre-chamber with the combustion chamber. In such engines, fuel and air are supplied to the combustion chamber outside the combustion pre-chamber to form the air-fuel mixture. Part of the air-fuel mixture flows into the combustion pre-chamber via the orifices. The spark plug then ignites the part of the air-fuel mixture in the combustion pre-chamber. The ignited air-fuel mixture flows from the combustion pre-chamber to the combustion chamber via the orifices to ignite the air-fuel mixture in the combustion chamber. Such an arrangement usually results in a faster combustion of the air-fuel mixture in the combustion chamber, which leads to a more efficient internal combustion engine.

The use of combustion pre-chambers has some drawbacks however. The combustion pre-chamber housing needs to be properly cooled, otherwise this could lead to glow ignition (i.e., ignition due to the heat from the combustion pre-chamber housing). Also, since the combustion pre-chamber housing passes through the cylinder head, if not properly sealed, fluid in the cylinder head, such as coolant and/or lubricant, could flow into the combustion chamber. Similarly, the air-fuel mixture and/or exhaust gases could flow from the combustion chamber into the cylinder head. Also, any gaps between the combustion pre-chamber housing and the cylinder head could result in coking.

Therefore, there is a desire for an internal combustion engine with a combustion pre-chamber that can overcome at least some of the above-described drawbacks.

SUMMARY

It is an object of the present technology to ameliorate at least some of the inconveniences present in the prior art.

According to one aspect of the present technology, there is provided an internal combustion engine having: a cylinder block defining a cylinder; a cylinder head connected to the cylinder block, the cylinder head defining a seat; a piston disposed in the cylinder; a crankshaft operatively connected to the piston, the piston, cylinder and cylinder head defining a variable volume combustion chamber therebetween; an air intake passage fluidly connected to the combustion chamber; an exhaust passage fluidly connected to the combustion chamber; a fuel injector fluidly connected to the combustion chamber for supplying fuel to the combustion chamber; and a combustion pre-chamber housing connected to the cylinder head and extending in part into the combustion chamber. The combustion pre-chamber housing has: a tapering portion; and a tip connected to the tapering portion. The tapering portion abuts the seat of the cylinder head. The tapering portion tapers toward the tip. The seat of the cylinder head and the tapering portion of the combustion pre-chamber housing have corresponding shapes. The combustion pre-chamber housing defines: a combustion pre-chamber; and at least one orifice fluidly communicating the combustion pre-chamber with the combustion chamber. A spring biases the tapering portion of the combustion pre-chamber housing against the seat of the cylinder head. A spark plug is connected to the combustion pre-chamber housing. During operation of the engine: the air intake passage supplies air into the combustion chamber and the fuel injector supplies fuel into the combustion chamber to form an air-fuel mixture in the combustion chamber; part of the air-fuel mixture flows from the combustion chamber to the combustion pre-chamber via the at least one orifice; the spark plug ignites the part of the air-fuel mixture in the combustion pre-chamber; and the ignited air-fuel mixture flows from the combustion pre-chamber to the combustion chamber via the at least one orifice to ignite the air-fuel mixture in the combustion chamber.

In some embodiments, the cylinder head defines a coolant jacket; and the combustion pre-chamber housing extends through the coolant jacket.

In some embodiments, the combustion pre-chamber housing has an end portion; and the tapering portion is disposed between the tip and the end portion. The internal combustion engine also has a seal disposed between the end portion and the cylinder head. The coolant jacket passing between the seal and the seat in the cylinder head.

In some embodiments, the combustion pre-chamber housing has ribs disposed in the coolant jacket.

In some embodiments, a spark plug tube is connected to the cylinder head. The spark plug extends in the spark plug tube. The spring is disposed between the spark plug tube and the combustion pre-chamber housing.

In some embodiments, the spring is a disc spring.

In some embodiments, the spark plug is screwed into the combustion pre-chamber housing.

In some embodiments, the combustion pre-chamber has: a frustoconical portion; a hemispherical portion; and a cylindrical portion extending between the frustoconical portion and the hemispherical portion. The at least one orifice extends from the hemispherical portion.

In some embodiments, the at least one orifice is defined in the tip.

In some embodiments, the at least one orifice is a plurality of orifices.

In some embodiments, the plurality of orifices is six orifices.

In some embodiments, the orifices of the plurality of orifices are disposed about a central axis. The orifices extend at an angle relative to the central axis.

In some embodiments, the cylinder defines a cylinder axis. The central axis is parallel to or coaxial with the cylinder axis.

In some embodiments, the combustion pre-chamber defines a pre-chamber axis. The pre-chamber axis is angled relative to the cylinder axis.

In some embodiments, the cylinder defines a cylinder axis; the combustion pre-chamber defines a pre-chamber axis; the spark plug defines a spark plug axis coaxial with the pre-chamber axis; and the pre-chamber axis and spark plug axis are angled relative to the cylinder axis.

In some embodiments, the tip is hemispherical.

In some embodiments, the tapering portion of the combustion pre-chamber housing is frustoconical.

In some embodiments, the fuel injector supplies fuel in the air intake passage upstream of the combustion chamber.

According to another aspect of the present technology, there is provided an internal combustion engine having: a cylinder block defining a cylinder; a cylinder head connected to the cylinder block, the cylinder head defining a seat, the cylinder head defining a coolant jacket; a single camshaft rotationally supported in the cylinder head; a piston disposed in the cylinder; a crankshaft operatively connected to the piston, the piston, cylinder and cylinder head defining a variable volume combustion chamber therebetween; an air intake passage fluidly connected to the combustion chamber; an exhaust passage fluidly connected to the combustion chamber; a fuel injector fluidly connected to the combustion chamber for supplying fuel to the combustion chamber; and a combustion pre-chamber housing connected to the cylinder head, being received in the seat, and extending in part into the combustion chamber, the combustion pre-chamber housing extending through the coolant jacket. The combustion pre-chamber housing has: an end portion; and a tip disposed in the combustion chamber and connected to the end portion, the tip and the end portion being on opposite sided of the coolant jacket. The combustion pre-chamber housing defines: a combustion pre-chamber; and at least one orifice fluidly communicating the combustion pre-chamber with the combustion chamber. The internal combustion chamber also has a spark plug tube screwed to the cylinder head; a spark plug connected to the combustion pre-chamber housing, the spark plug extending into the spark plug tube; a first seal disposed between the end portion and the cylinder head, the coolant jacket passing between the seal and the seat in the cylinder head; and a second seal disposed between the combustion pre-chamber housing and the cylinder head around the seat, the first seal being disposed between the second seal and the spark plug tube. During operation of the engine: the air intake passage supplying air into the combustion chamber and the fuel injector supplying fuel into the combustion chamber to form an air-fuel mixture in the combustion chamber; part of the air-fuel mixture flowing from the combustion chamber to the combustion pre-chamber via the at least one orifice; the spark plug igniting the part of the air-fuel mixture in the combustion pre-chamber; and the ignited air-fuel mixture flowing from the combustion pre-chamber to the combustion chamber via the at least one orifice to ignite the air-fuel mixture in the combustion chamber.

In some embodiments, the first seal is an O-ring and the second seal is a flat sealing ring.

In the context of the present specification, unless expressly provided otherwise, the words “first”, “second”, “third”, etc. have been used as adjectives only for the purpose of allowing for distinction between the nouns that they modify from one another, and not for the purpose of describing any particular relationship between those nouns.

It must be noted that, as used in this specification and the appended claims, the singular form “a”, “an” and “the” include plural referents unless the context clearly dictates otherwise.

As used herein, the term “about” in the context of a given value or range refers to a value or range that is within 20%, preferably within 10%, and more preferably within 5% of the given value or range.

As used herein, the term “and/or” is to be taken as specific disclosure of each of the two specified features or components with or without the other. For example, “A and/or B” is to be taken as specific disclosure of each of (i) A, (ii) B and (iii) A and B, just as if each is set out individually herein.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
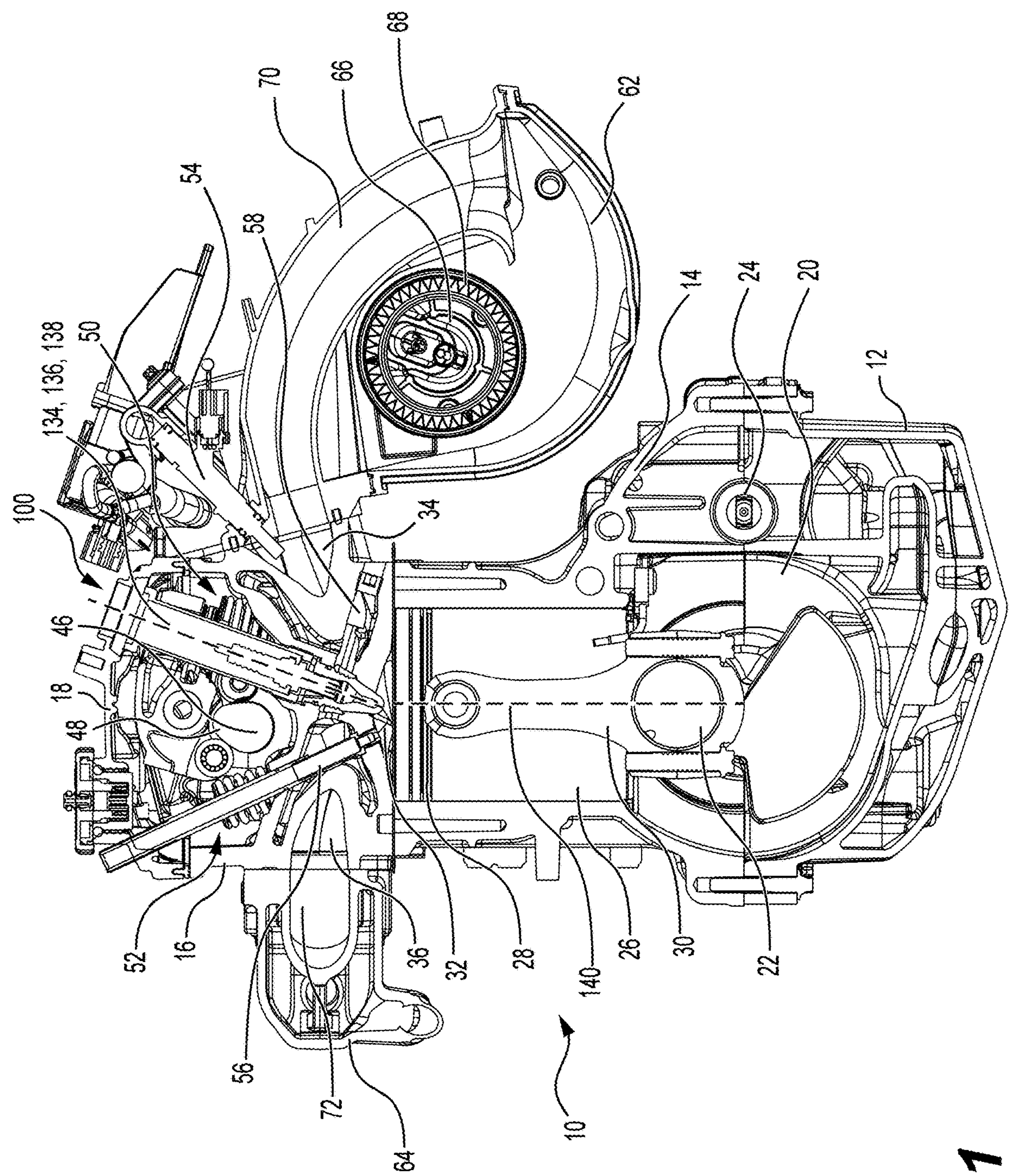
FIG. 1 is a cross-sectional view of an internal combustion engine taken along a plane normal to an axis of rotation of a crankshaft of the engine.
Figure 2:
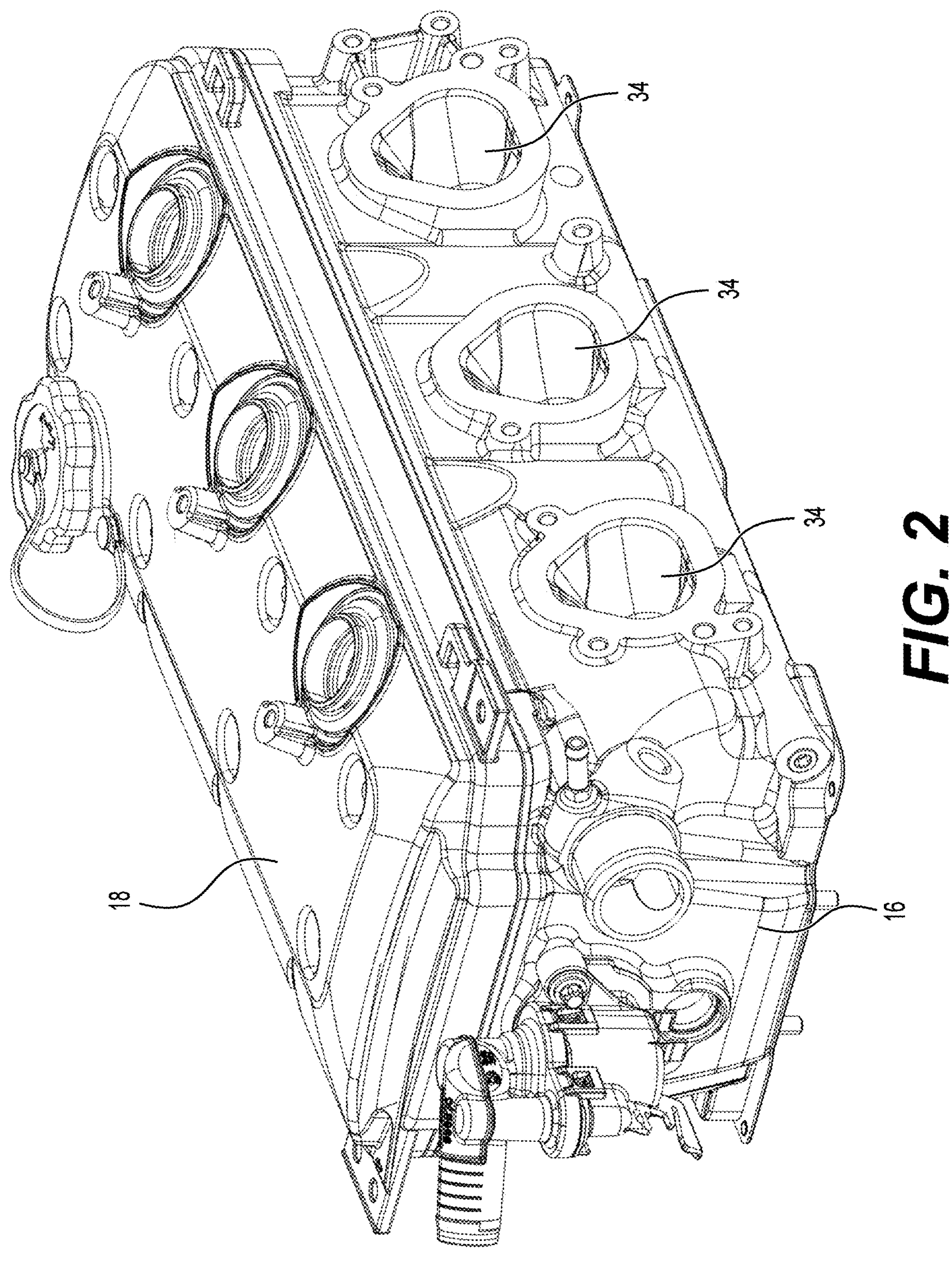
FIG. 2 is a perspective view taken from an intake side of the engine of FIG. 1 of a cylinder head and a valve cover of the engine of FIG. 1 and associated components thereof.
Figure 3:
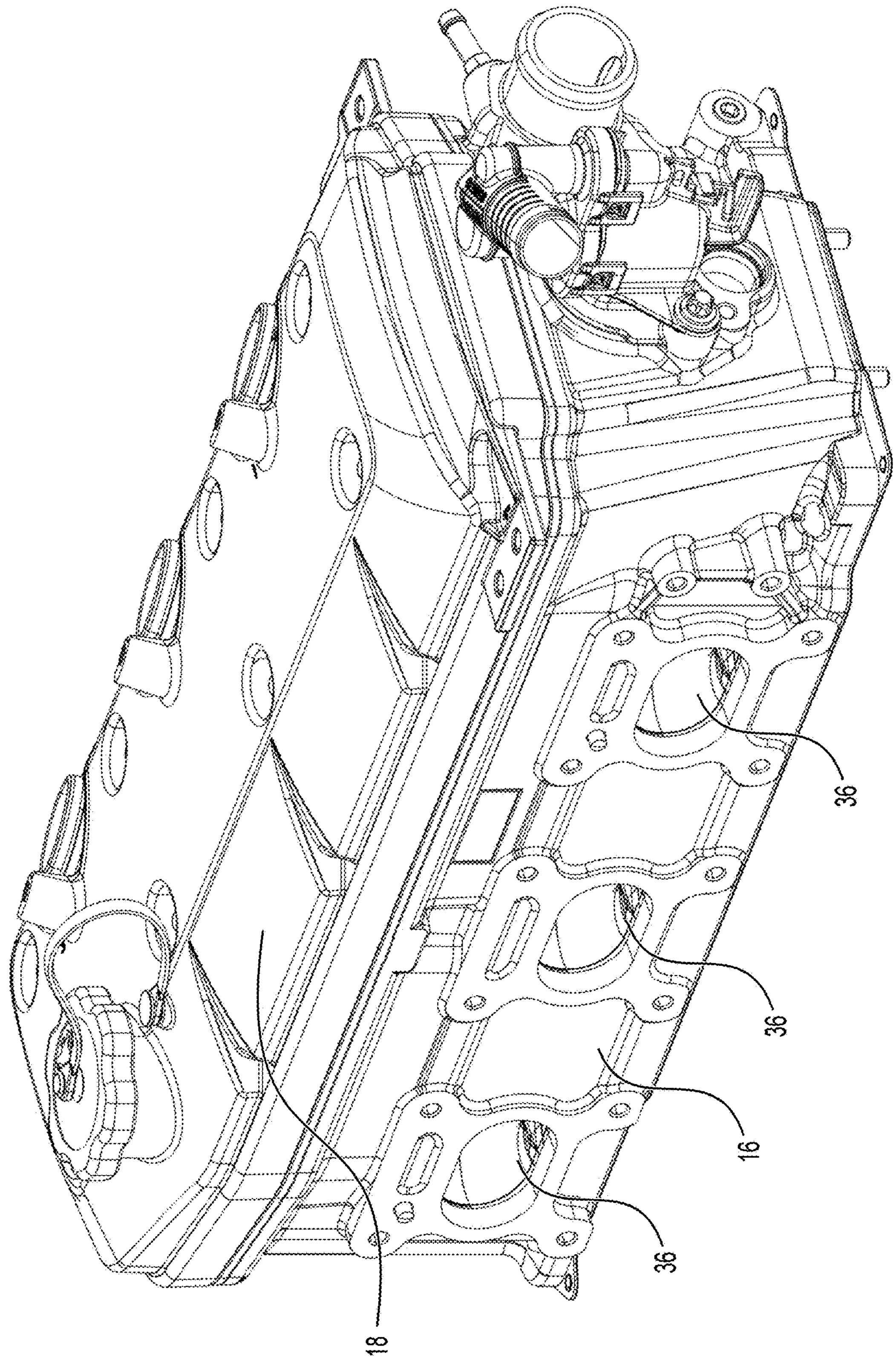
FIG. 3 is a perspective view taken from an exhaust side of the engine of FIG. 1 of the components of FIG. 2.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

An internal combustion engine 10 in accordance with the present technology will be described with reference to FIGS. 1 to 5. The internal combustion engine 10 (hereinafter the engine 10) is a four-stroke, in-line, three-cylinder, port fuel injection engine. It is contemplated that at least some aspects of the present technology could be provided in other types of engines such as, for example, engines operating on the two-stroke or diesel cycle, V-type or boxer engines, engines having more or less than three cylinders, and/or engines having direct fuel injection.

The engine 10 having an oil pan 12, a cylinder block 14 disposed on and connected to the oil pan 12, a cylinder head 16 disposed on and connected to the cylinder block 14, and a valve cover 18 disposed on and connected to the cylinder head 16.

The oil pan 12 and a lower portion of the cylinder block 14 together define a crankcase 20. A crankshaft 22 is rotationally supported in the crankcase 20. The crankshaft 22 drives a counterbalance shaft 24 also rotationally supported by the crankcase 20. The cylinder block 14 defines three cylinders 26. It is contemplated that the cylinder block 14 could define only one, two or more than three cylinders 26. A piston 28 is disposed in each cylinder 26 and can reciprocate therein. Each piston 28 is connected to the crankshaft 22 by a connecting rod 30. For each cylinder 26, the piston 28, the cylinder 26 and the cylinder head 16 define a variable volume combustion chamber 32.

Figure 4:
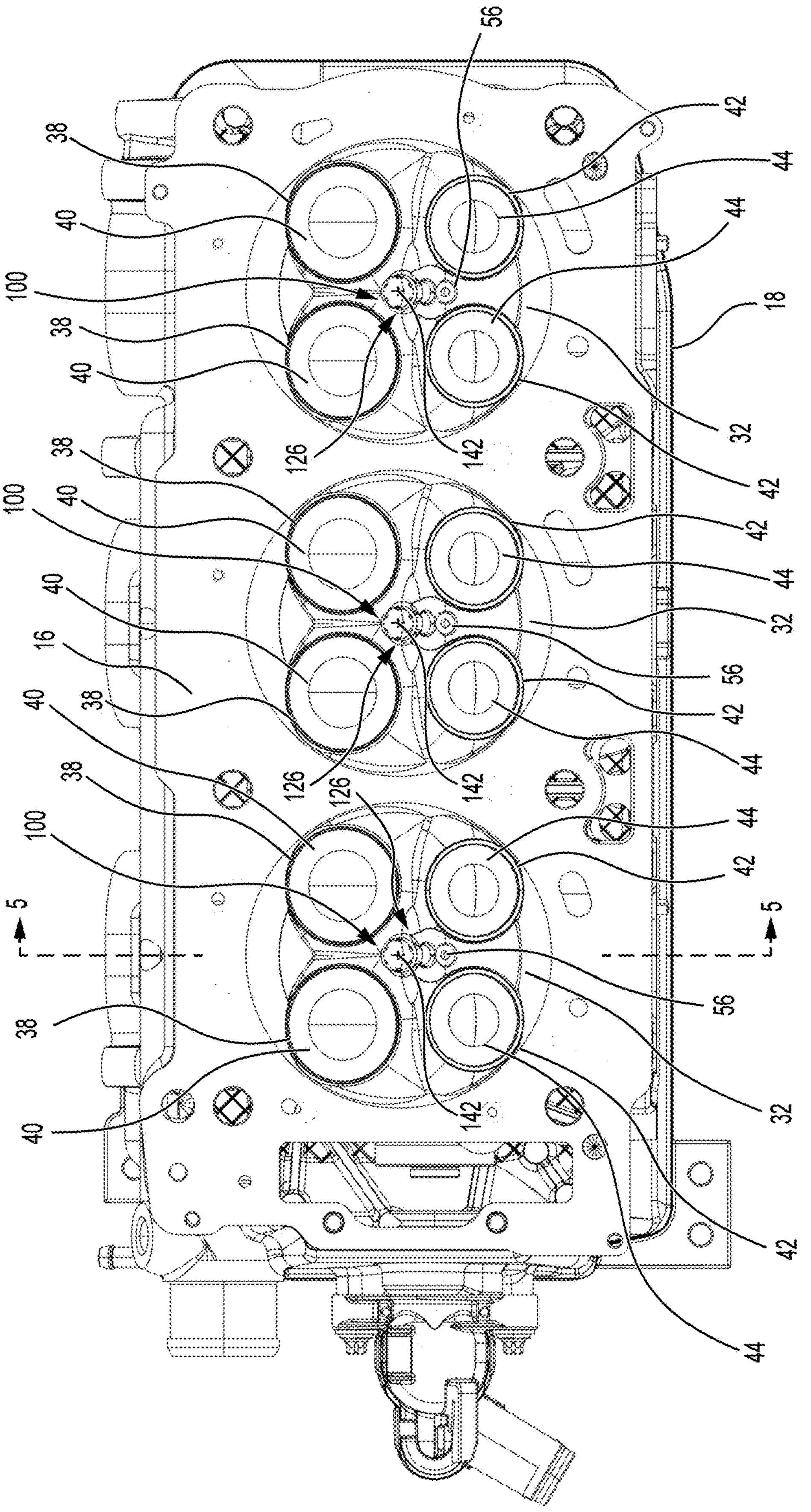
FIG. 4 is a bottom plan view of the components of FIG. 2.

For each cylinder 26, the cylinder head 16 defines an air intake passage 34 and an exhaust passage 36 that fluidly communicate with the combustion chamber 32. Each air intake passage 34 fluidly communicates with the combustion chamber 32 via two air inlets 38 (FIG. 4). The air inlets 38 are opened and closed by intake valves 40 (FIG. 4). Each exhaust passage 36 fluidly communicates with the combustion chamber 32 via two exhaust outlets 42 (FIG. 4). The exhaust outlets 42 are opened and closed by exhaust valves 44 (FIG. 4). The cylinder head 16 rotationally supports a single camshaft 46 having cams 48 thereon. The camshaft 46 is driven by the crankshaft 22 via a chain and sprocket assembly (not shown). The rotation of the camshaft 46 and cams 48 actuates intake valve actuation mechanisms 50 and exhaust valve actuation mechanisms 52 that open and close the intake valves 40 and the exhaust valves 44. For each air intake passage 34, a fuel injector 54 is connected to the cylinder block 14 to inject fuel in the air intake passage 34 upstream of the intake valves 40 which is then supplied to the combustion chamber 32. For each cylinder 26, a pressure transducer 56 and a spark plug assembly 100 are connected to the cylinder head 16 and communicate with the combustion chamber 32. It is contemplated that the pressure transducer 56 could be omitted. The spark plug assembly 100 will be described in more detail below. The cylinder head 16 also defines a coolant jacket 58 through which coolant flows to cool various components defined by and provided in the cylinder head 16. An oil pump (not shown) supplies oil in the cylinder head 16 to lubricate the components provided therein, such as the camshaft 46, cams 48, intake valve actuation mechanisms 50 and exhaust valve actuation mechanisms 52.

With reference to FIG. 1, an air intake manifold 62 is connected to the air intake passages 34 and an exhaust manifold 64 is connected to the exhaust passage 36. The air intake manifold 62 has a single inlet 66 connected to a throttle body (not shown) controlling the air flow rate into the air intake manifold 62. An air filter 68 disposed inside the air intake manifold 62 filters the air entering the air intake manifold 62 from the inlet 66. The air intake manifold 62 has three pipes 70, each one of which is connected to a corresponding air intake passage 34 to supply air to the air intake passages 34. The exhaust manifold 64 has three passages 72, each one of which is connected to a corresponding exhaust passage 36 to receive exhaust gases from the exhaust passages 36. From the passages 72 the exhaust gases flow out of the exhaust manifold 64 via a single outlet (not shown) into an exhaust system (not shown).

Turning now to FIGS. 5 to 9, the spark plug assembly 100 will be described in more detail. The spark plug assembly 100 includes a spark plug 102, a spark plug tube 104, a crown 106, a spring 108, a seal 110, a combustion pre-chamber housing 112 (hereinafter the housing 112), and a pin 114.

The crown 106 is connected to the top of the spark plug tube 104. The spring 108 is disposed between and abuts a bottom of the spark plug tube 104 and a top of the housing 112. In the present embodiment, the spring 108 is a disc spring, but other types of springs are contemplated. The spark plug 102 extends inside the spark plug tube 104 and inside the housing 112. The spark plug 102 is screwed in into the housing 112. The seal 110 is disposed around a top end portion 116 of the housing 112. In the present embodiment, the seal 110 is an O-ring, but other types of seals are contemplated. The pin 114 is inserted in a hole 118 (FIG. 8) made in a side of the top end portion 116 above the seal 110.

The housing 112 has a tip 120 and a tapering portion 122 connected to and disposed between the tip 120 and the end portion 116. The tapering portion 122 tapers to toward the tip 120. In the present embodiment, the tapering portion 122 is frustoconical in shape. It is contemplated that in alternative embodiments, the tapering portion 122 could have another shape, such as, but not limited to, a zone of a sphere, of a catenoid, or of a paraboloid. In the present embodiment, the tip 120 is hemispherical. It is contemplated that in alternative embodiments, the tip 120 could have another shape, such as, but not limited to, a segment of a sphere, a catenoid or a paraboloid.

Figure 8:
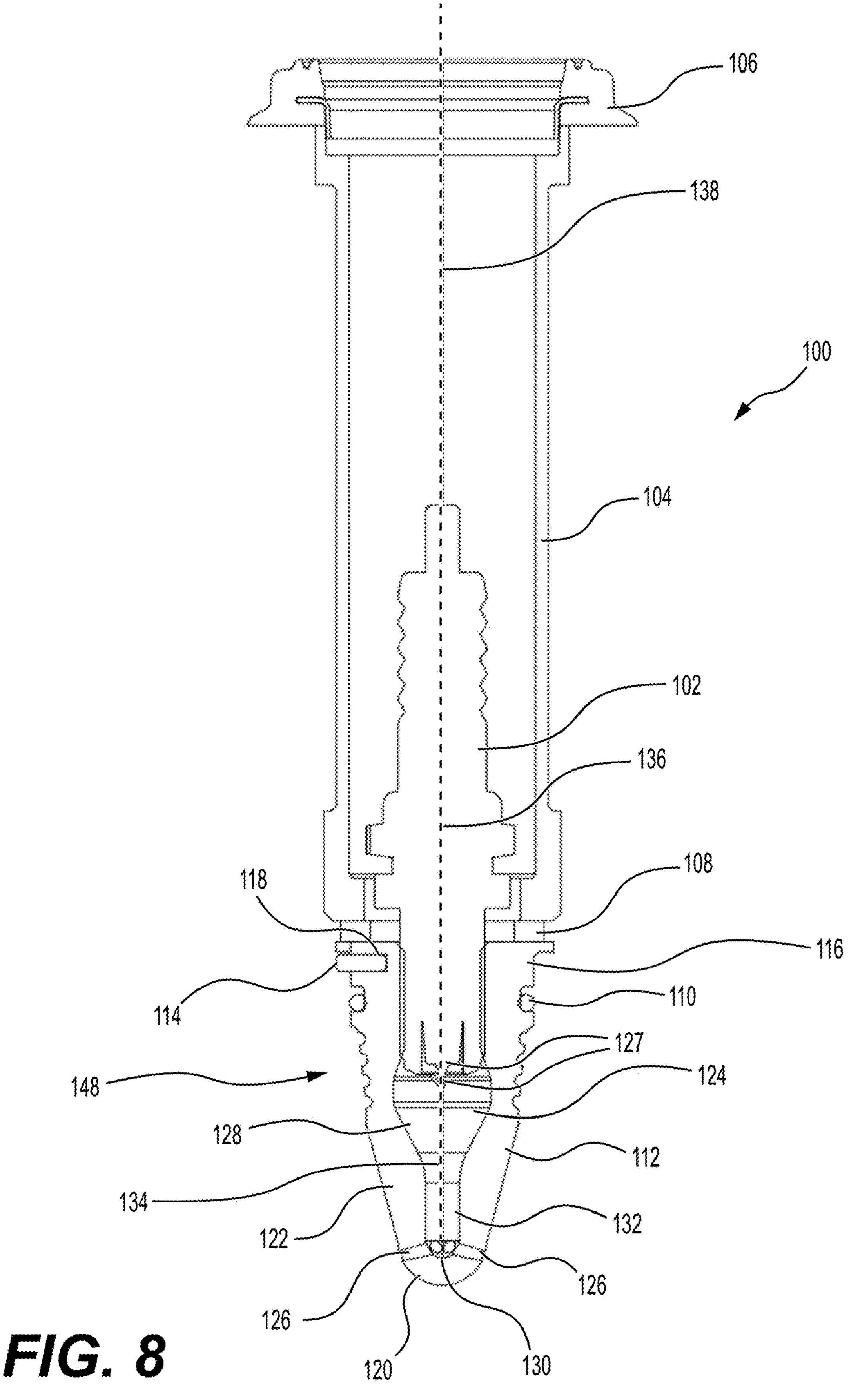
FIG. 8 is a cross-sectional view of the spark plug assembly of FIG. 6 taken through a center thereof.
Figure 9:
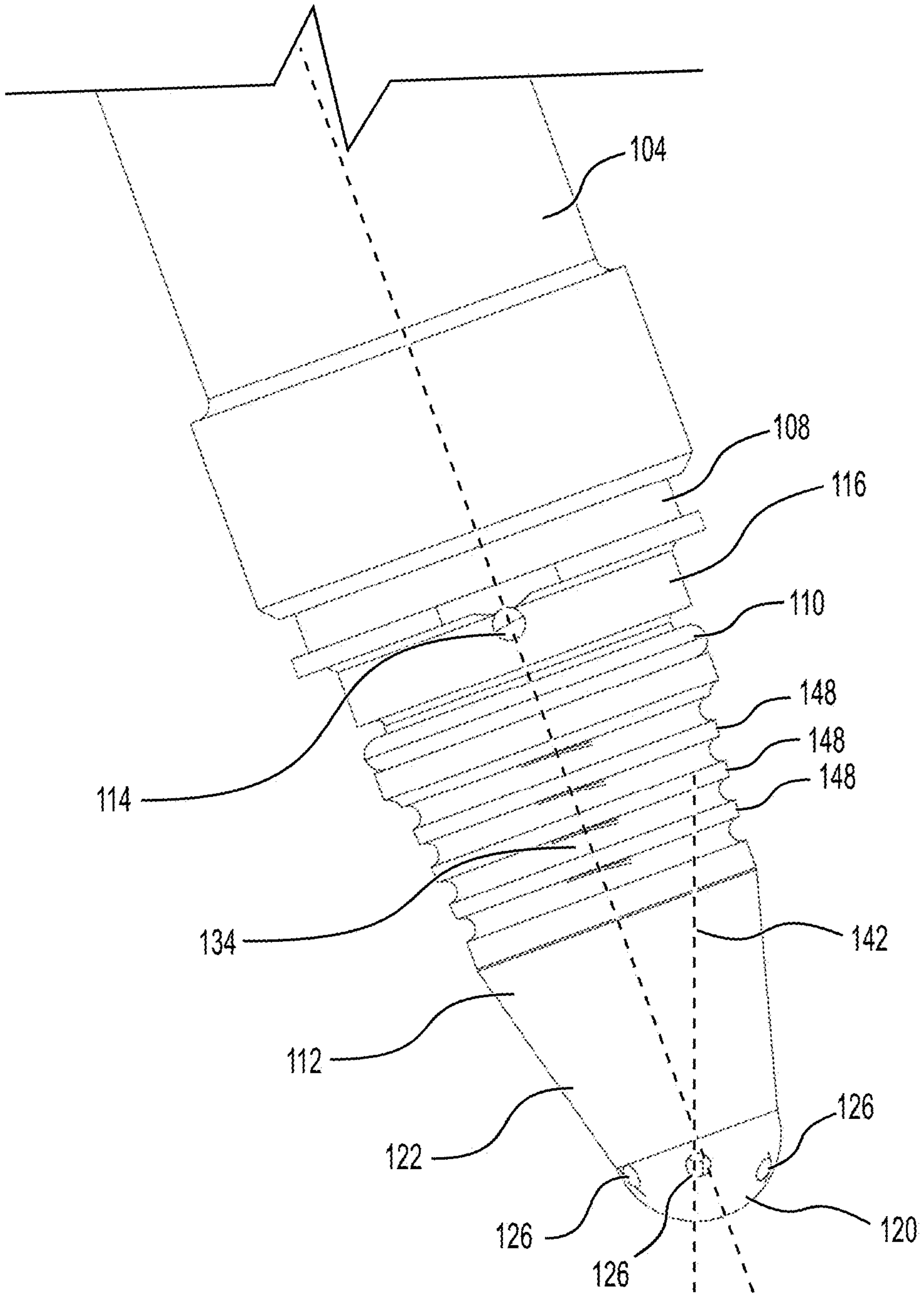
FIG. 9 is a close-up view of a lower end of the spark plug assembly of FIG. 6 taken from another side of the spark plug assembly.

The housing 112 defines a combustion pre-chamber 124 and six orifices 126 fluidly communicating the combustion pre-chamber 124 with the combustion chamber 32. It is contemplated that the housing 112 could define more or less than six orifices 126, including a single orifice 126. As can be seen in FIG. 8, electrodes 127 of the spark plug 102 are located at a top of the combustion pre-chamber 124.

Figure 5:
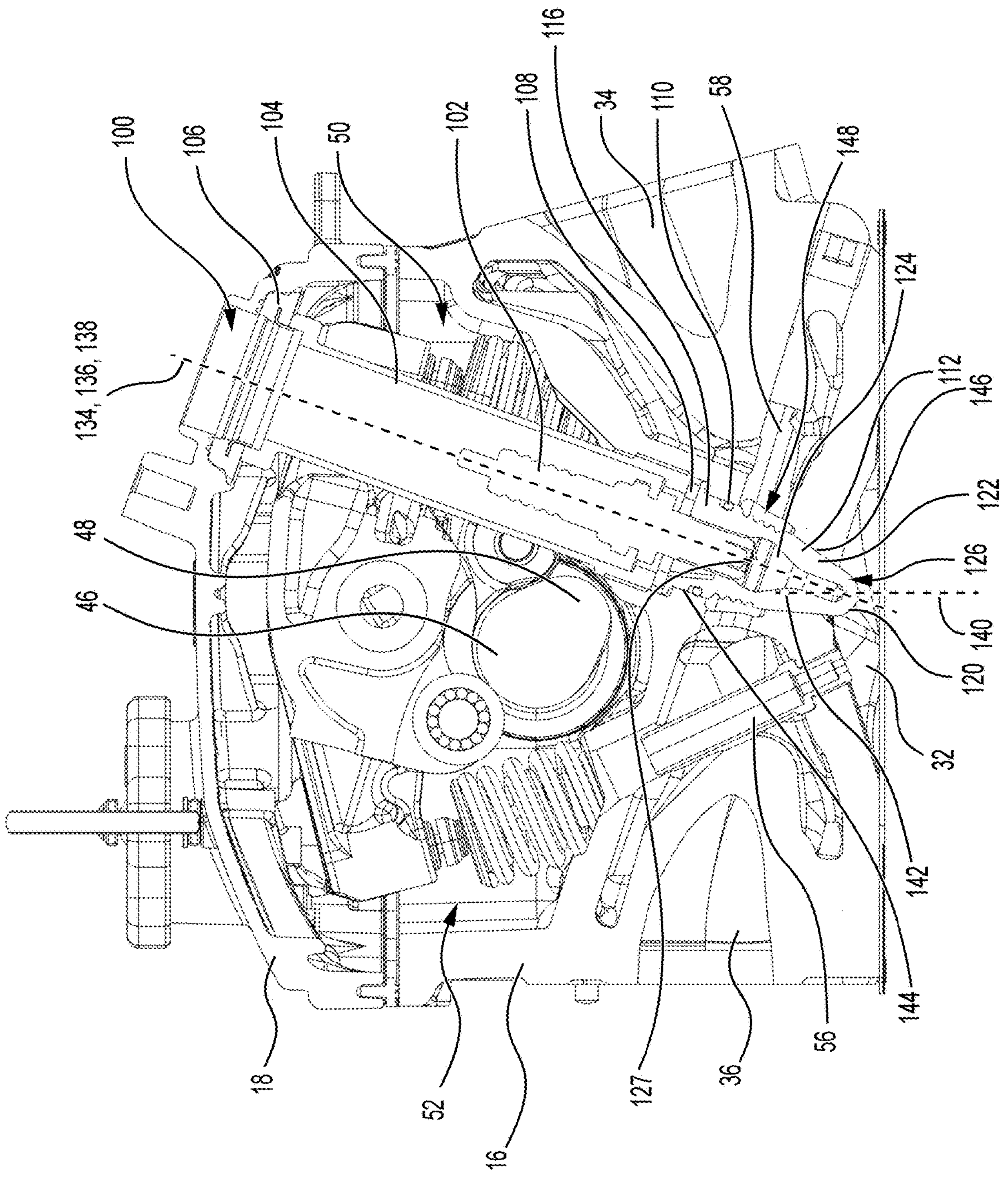
FIG. 5 is a cross-sectional view of the components of FIG. 2 taken through line 5-5 of FIG. 4.
Figure 6:
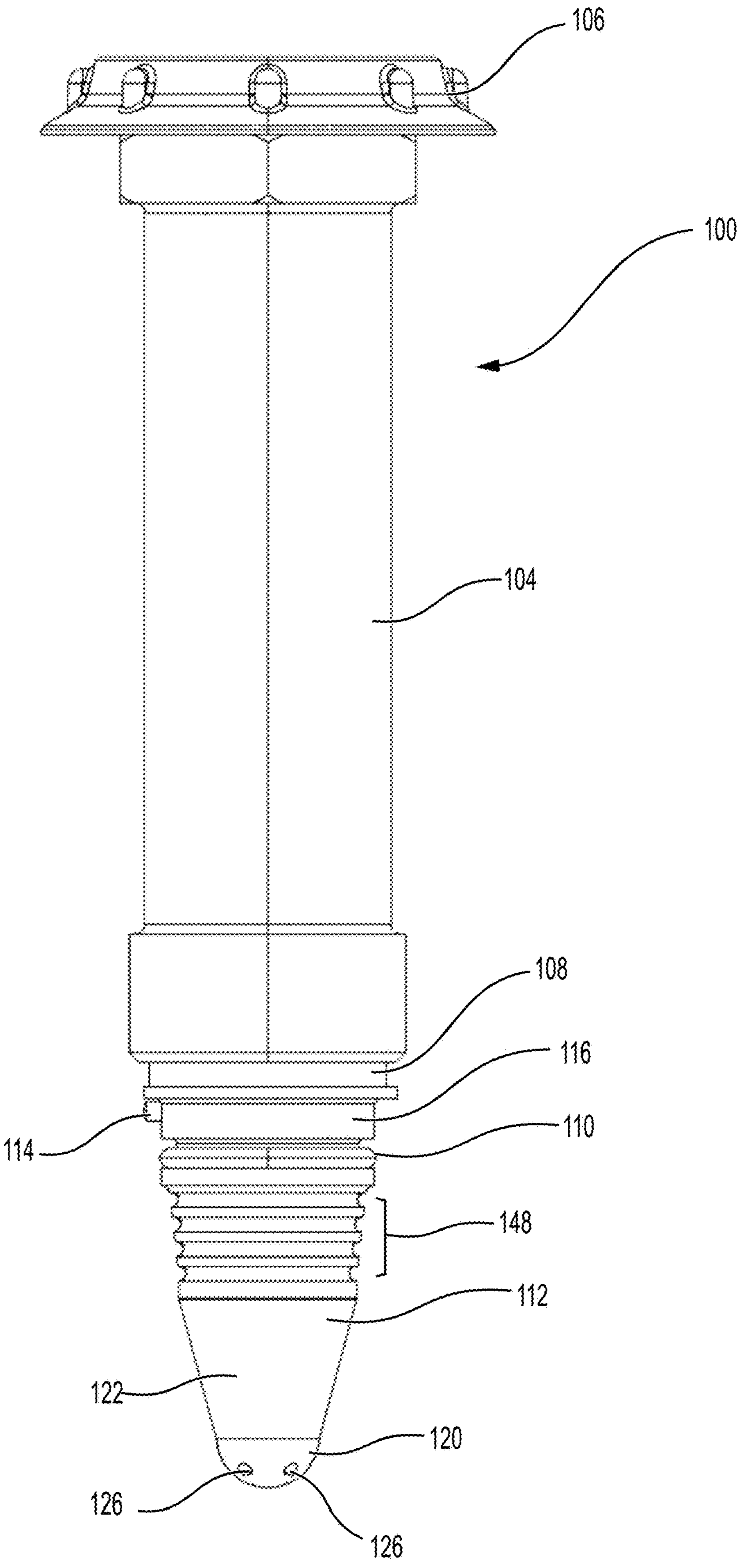
FIG. 6 is a side view of a spark plug assembly of the engine of FIG. 1.
Figure 7:
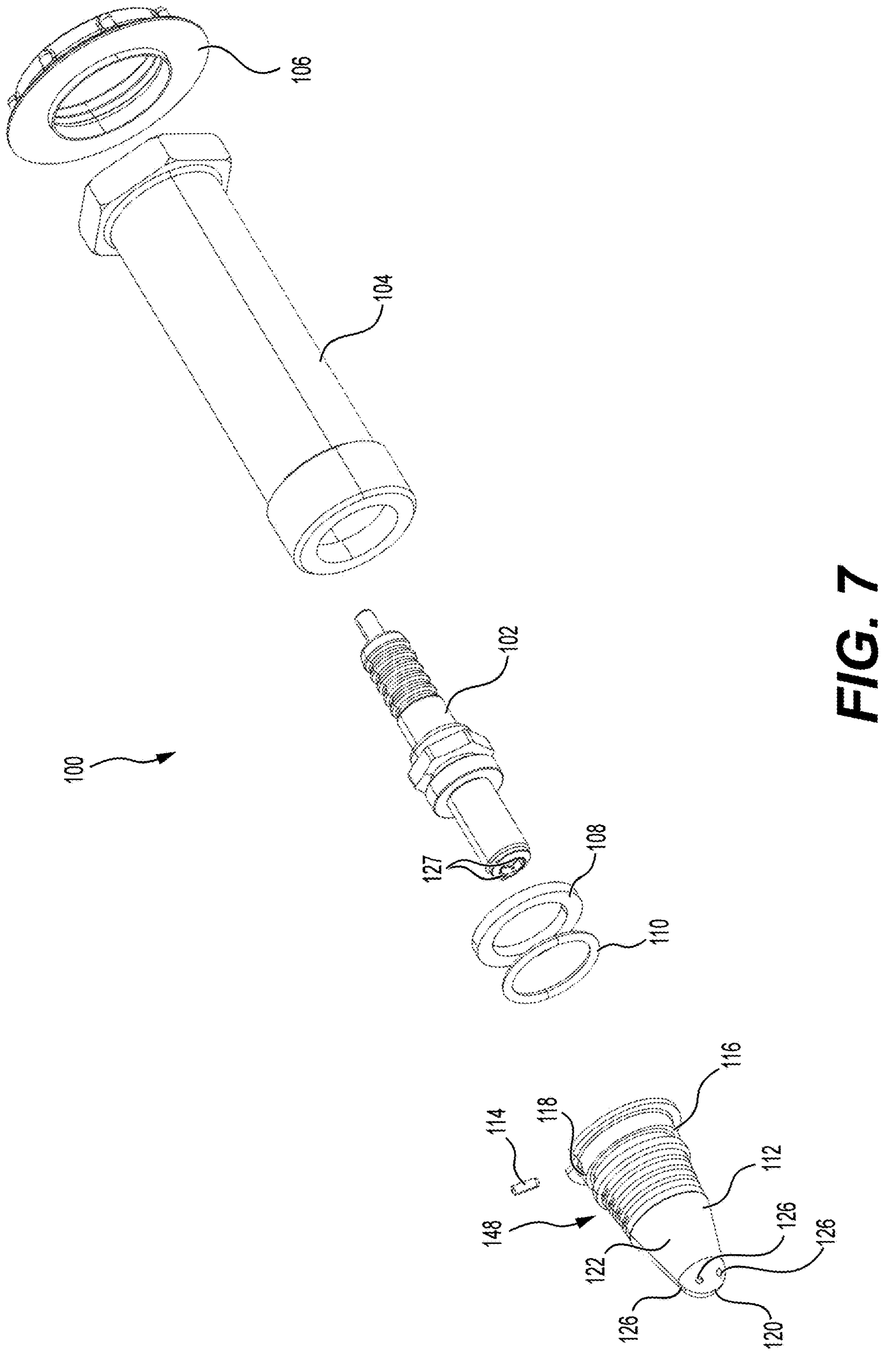
FIG. 7 is an exploded view of the spark plug assembly of FIG. 6.

With reference to FIG. 8, the combustion pre-chamber 124 has a frustoconical portion 128, a hemispherical portion 130, and a cylindrical portion 132 extending between the frustoconical portion 128 and the hemispherical portion 130. It is contemplated that the combustion pre-chamber 124 could have a different geometry. The combustion pre-chamber 124 defines a pre-chamber axis 134 extending through a center of the combustion pre-chamber 124. As can be seen in FIG. 8, the pre-chamber axis 134 is coaxial with a spark plug axis 136 defined by and passing through a center of the spark plug 102. As can also be seen in FIG. 8, the pre-chamber axis 134 is also coaxial with a spark plug tube axis 138 defined by and passing through a center of the spark plug tube 104. With reference to FIGS. 1 and 5, the axes 134, 136, 138 are angled relative to a cylinder axis 140 defined by and passing through a center of the cylinder 26. It is contemplated that the axes 134, 136, 138 could be parallel to the cylinder axis 140.

The orifices 126 are defined in the tip 120 and extend from the hemispherical portion 130 of the combustion pre-chamber 124. As best seen in FIG. 4, the orifices 126 are disposed about a central axis 142. As can be seen in FIG. 8, the orifices 126 extend at an angle relative to the central axis 142. In the present embodiment, the central axis 142 is coaxial with the cylinder axis 140. It is contemplated that in some embodiments, the central axis 142 could be parallel to the cylinder axis 140. It is also contemplated that in some embodiments, the central axis 142 could be at an angle relative to the cylinder axis 140. As in the present embodiment the central axis 142 is coaxial with the cylinder axis 140, the central axis 142 is angled relative to the axes 134, 136, 138.

With reference to FIG. 5, for each combustion chamber 32, the cylinder head 16 defines a bore 144 and a seat 146 to receive the spark plug assembly 100. The coolant jacket 58 passes between the bore 144 and the seat 146. The lower portion of the spark plug tube 104 is received in and screwed into the bore 144. The top end portion 116 of the housing 112 is received in the bore 144. The seal 110 is disposed radially between the top end portion 116 of the housing 112 and the side wall of the bore 144 to prevent coolant in the coolant jacket 58 from flowing into the upper portion of the cylinder head 16 containing the camshaft 46, cams 48 and valve actuation mechanisms 50, 52 and to prevent oil in the upper portion of the cylinder head 16 from flowing into the coolant jacket 58. The tapering portion 122 of the housing 112 is received in and abuts the seat 146 which has a shape corresponding to the shape of the tapering portion 122 of the housing 112 (i.e., frustoconical in the present embodiment). As such, a seal is formed between the outer surface of the tapering portion 122 of the housing 112 and the inner surface of the seat 146. This seal prevents coolant from flowing from the coolant jacket 58 to the combustion chamber 32 and prevents air, fuel, and exhaust gases from flowing from the combustion chamber 32 to the coolant jacket 58. To help ensure that the housing 112 is properly oriented in the seat 146 in order to have a good seal and in order to have the orifices 126 properly oriented, the pin 114 is received in a notch (not shown) defined in the cylinder head 16. To improve the seal between the housing 112 and the seat 146, the spring 108 pushes the housing 112 away from the spark plug tube 104 such that the tapering portion 122 is biased against the seat 146. The top of the crown 106 of the spark plug assembly 100 is received in a recess defined in the valve cover 18. The top of the crown 106 abuts the valve cover 18, thereby providing a seal between the crown 106 and the valve cover 18.

As can be seen in FIG. 5, the housing 112 extends through the cooling jacket 58. As such, coolant flowing in the coolant jacket 58 cools the housing 112. To improve cooling, the portion of the housing 112 that is disposed in the coolant jacket 58 has ribs 148. It is contemplated that the ribs 148 could be omitted. The electrodes 127 of the spark plug 102 are aligned with the coolant jacket 58.

As can also be seen in FIG. 5, the housing 112 protrudes from the seat 146 into the combustion chamber 32. More specifically, the tip 120 and part of the tapering portion 122 extend into the combustion chamber 32 such that the orifices 126 open into the combustion chamber 32. For each combustion chamber 32, during operation of the engine 10, the fuel injector 54 injects fuel in the air intake passage 34 and, when the intake valves 40 open, air and fuel are supplied into the combustion chamber 32 from the air intake passage 34 thereby forming an air-fuel mixture in the combustion chamber 32. Part of the air-fuel mixture then flows from the combustion chamber 32 to the combustion pre-chamber 124 via the orifices 126. The spark plug 102 then ignites the part of the air-fuel mixture in the combustion pre-chamber 124. The ignited air-fuel mixture then flows from the combustion pre-chamber 124 to the combustion chamber 32 via the orifices 126. The ignited air-fuel mixture exits the orifices 126 as flame jets that ignite the air-fuel mixture in the combustion chamber 32. As such, the pre-chamber housing 112 creates multi-point ignition in the combustion chamber 32 using a single spark plug 102. The number of orifices 126, the angle between each orifice 126 and the central axis 142, and the angle between the orifices 126 and the diameter of the orifices 126 are selected depending on the desired ignition pattern in the combustion chamber 32. The exhaust gases resulting from the ignition of the air-fuel mixture in the combustion chamber 32 flow from the combustion chamber 32 to the exhaust passage 36 when the exhaust valves 44 open.

Turning now to FIGS. 10 to 14, a spark plug assembly 200, which is an alternative embodiment of the spark plug assembly 100, will be described. The spark plug assembly 200 is provided in an engine having features and characteristics similar to those of the engine 10 described above. As such, components of the engine having the spark plug assembly 200 that are similar to those of the engine 10 have been provided with the same reference numerals and will not be described again in detail.

The spark plug assembly 200 is connected to the cylinder head 16 and communicates with the combustion chamber 32. The spark plug assembly 200 includes a spark plug 202, a spark plug tube 204, a crown 206, a seal 208, a seal 210, a combustion pre-chamber housing 212 (hereinafter the housing 212), and a pin 214.

The crown 206 is connected to the top of the spark plug tube 204. The seal 208 is disposed between and abuts the housing 212 and the cylinder head 16 as will be described in greater detail below. In the present embodiment, the seal 208 is a flat sealing ring 208, but other types of seals are contemplated. The sealing ring 208 is made of copper to provide good heat conductivity, but other materials are contemplated. The spark plug 202 extends inside the spark plug tube 204 and inside the housing 212. The spark plug 202 is screwed in into the housing 212. The seal 210 is disposed around a top end portion 216 of the housing 212. In the present embodiment, the seal 210 is an O-ring, but other types of seals are contemplated. The pin 214 is inserted in a hole 218 (FIG. 13) made in a side of the top end portion 216 above the seal 210.

The housing 212 has a tip 220 and two cylindrical portions **222*a*, 222*b* connected to and disposed between the tip 220 and the end portion 216. The cylindrical portion 222*a* has a smaller radius than the cylindrical portion 222*b*. In the present embodiment, the tip 220 is hemispherical. It is contemplated that in alternative embodiments, the tip 220** could have another shape, such as, but not limited to, a segment of a sphere, a catenoid or a paraboloid.

Figure 13:
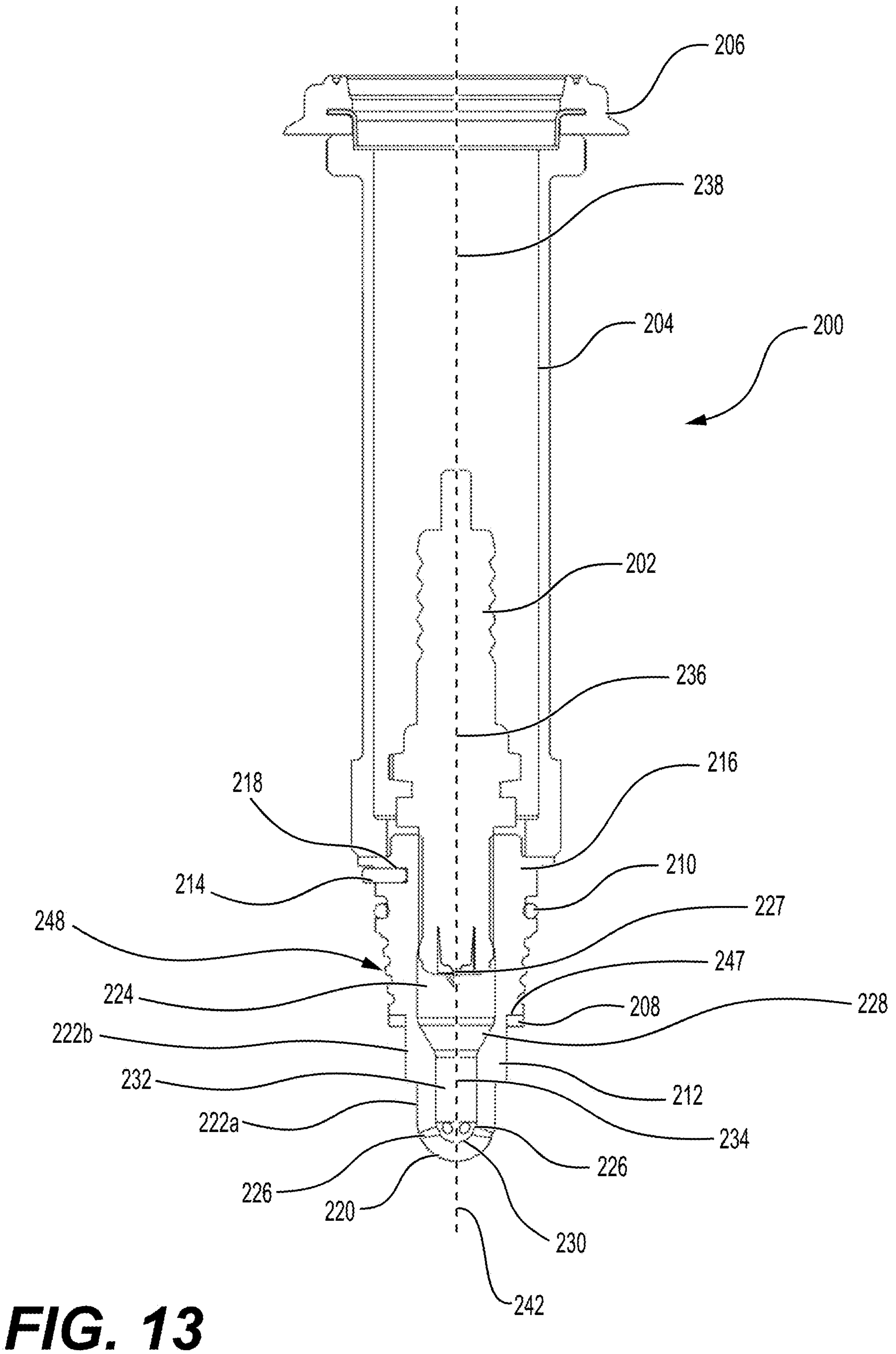
FIG. 13 is a cross-sectional view of the spark plug assembly of FIG. 11 taken through a center thereof.

The housing 212 defines a combustion pre-chamber 224 and six orifices 226 fluidly communicating the combustion pre-chamber 224 with the combustion chamber 32. It is contemplated that the housing 212 could define more or less than six orifices 226, including a single orifice 226. As can be seen in FIG. 13, electrodes 227 of the spark plug 202 are located at a top of the combustion pre-chamber 224.

Figure 10:
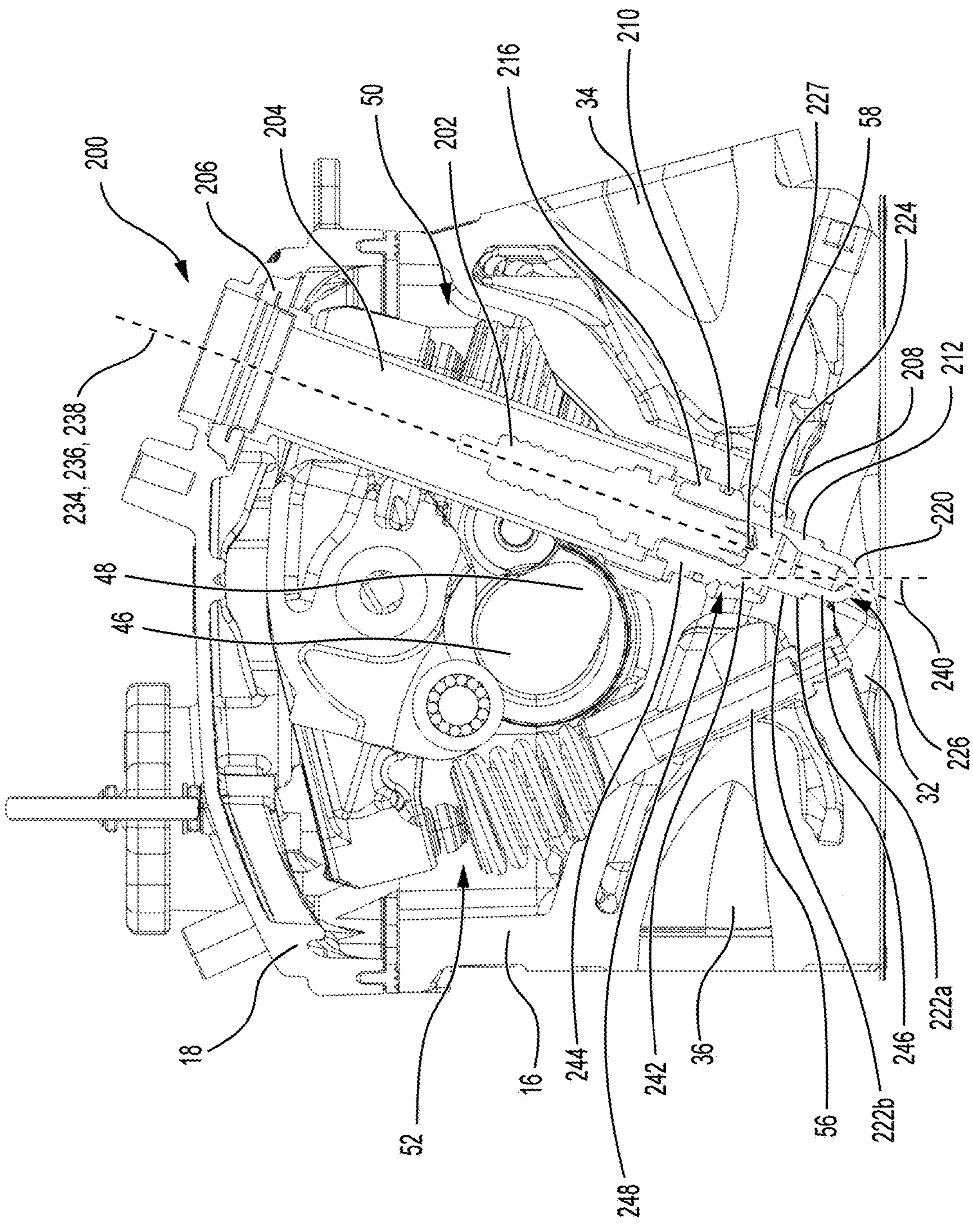
FIG. 10 is a cross-sectional view of a cylinder head and a valve cover of an alternative embodiment of the engine of FIG. 1 and associated components thereof.
Figure 11:
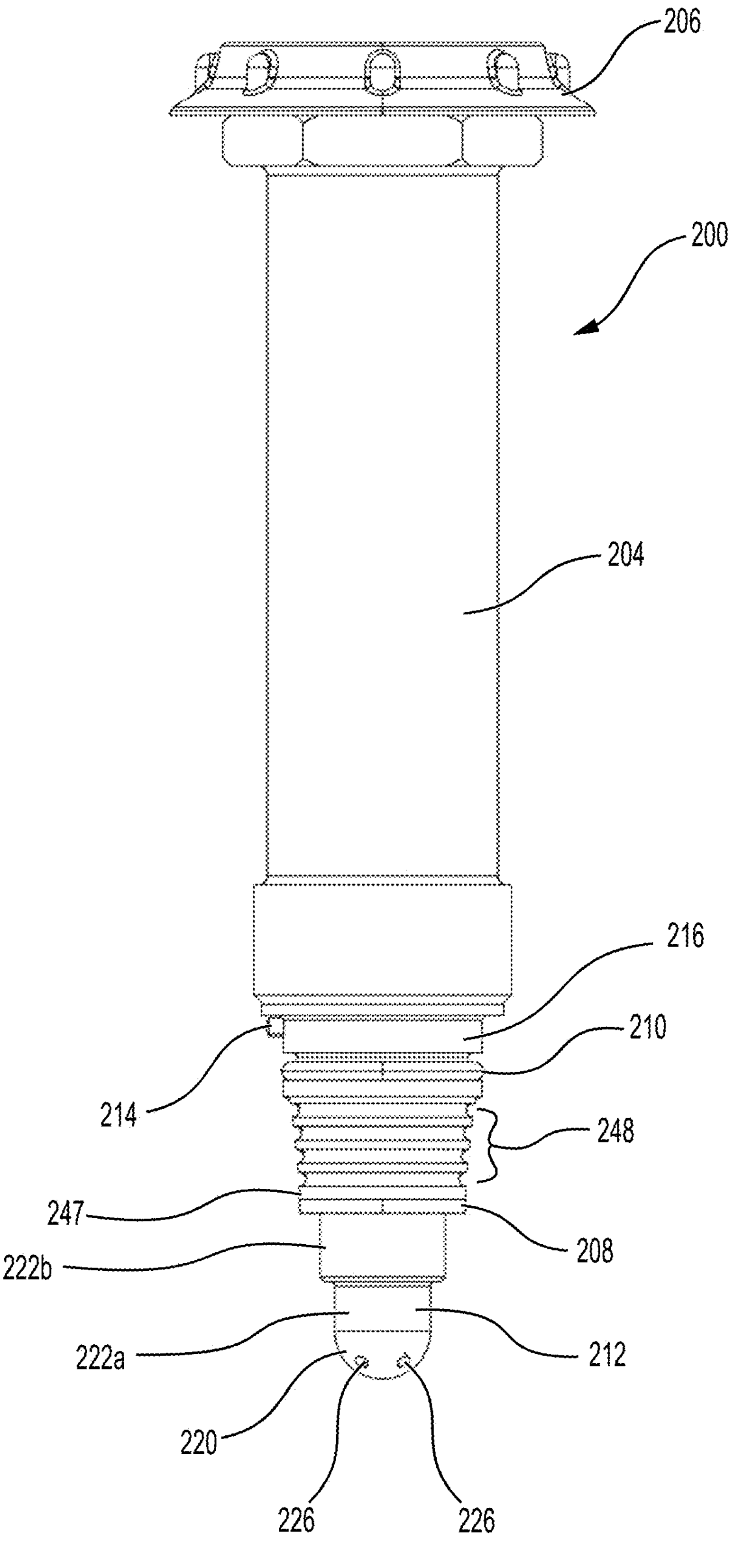
FIG. 11 is a side view of a spark plug assembly of the embodiment of FIG. 10.
Figure 12:
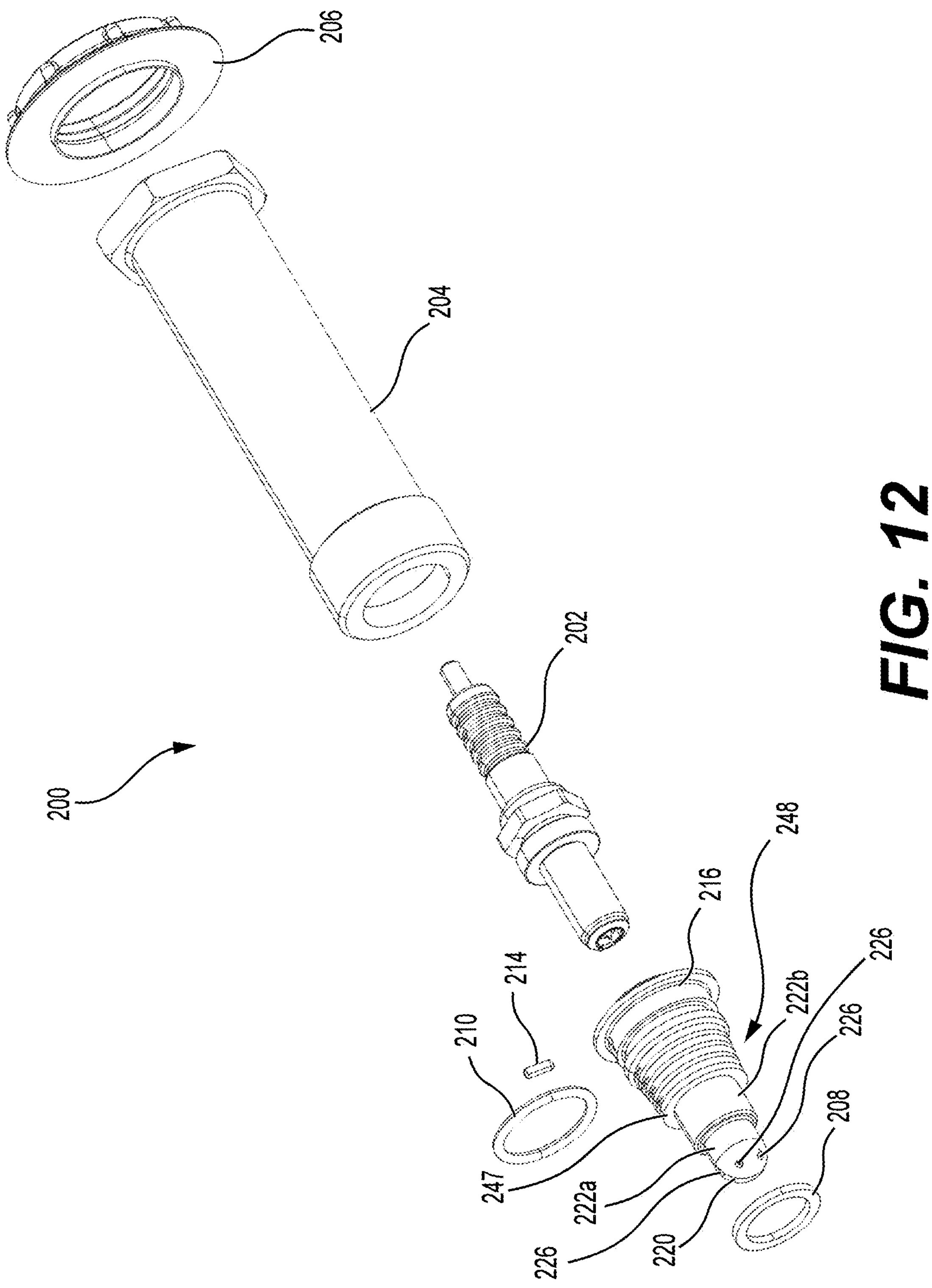
FIG. 12 is an exploded view of the spark plug assembly of FIG. 11.

With reference to FIG. 13, the combustion pre-chamber 224 has a frustoconical portion 228, a hemispherical portion 230, and a cylindrical portion 232 extending between the frustoconical portion 228 and the hemispherical portion 230. It is contemplated that the combustion pre-chamber 224 could have a different geometry. The combustion pre-chamber 224 defines a pre-chamber axis 234 extending through a center of the combustion pre-chamber 224. As can be seen in FIG. 13, the pre-chamber axis 234 is coaxial with a spark plug axis 236 defined by and passing through a center of the spark plug 202. As can also be seen in FIG. 13, the pre-chamber axis 234 is also coaxial with a spark plug tube axis 238 defined by and passing through a center of the spark plug tube 204. With reference to FIG. 10, the axes 234, 236, 238 are angled relative to a cylinder axis 240 defined by and passing through a center of the cylinder 26. It is contemplated that the axes 234, 236, 238 could be parallel to the cylinder axis 240.

Figure 14:
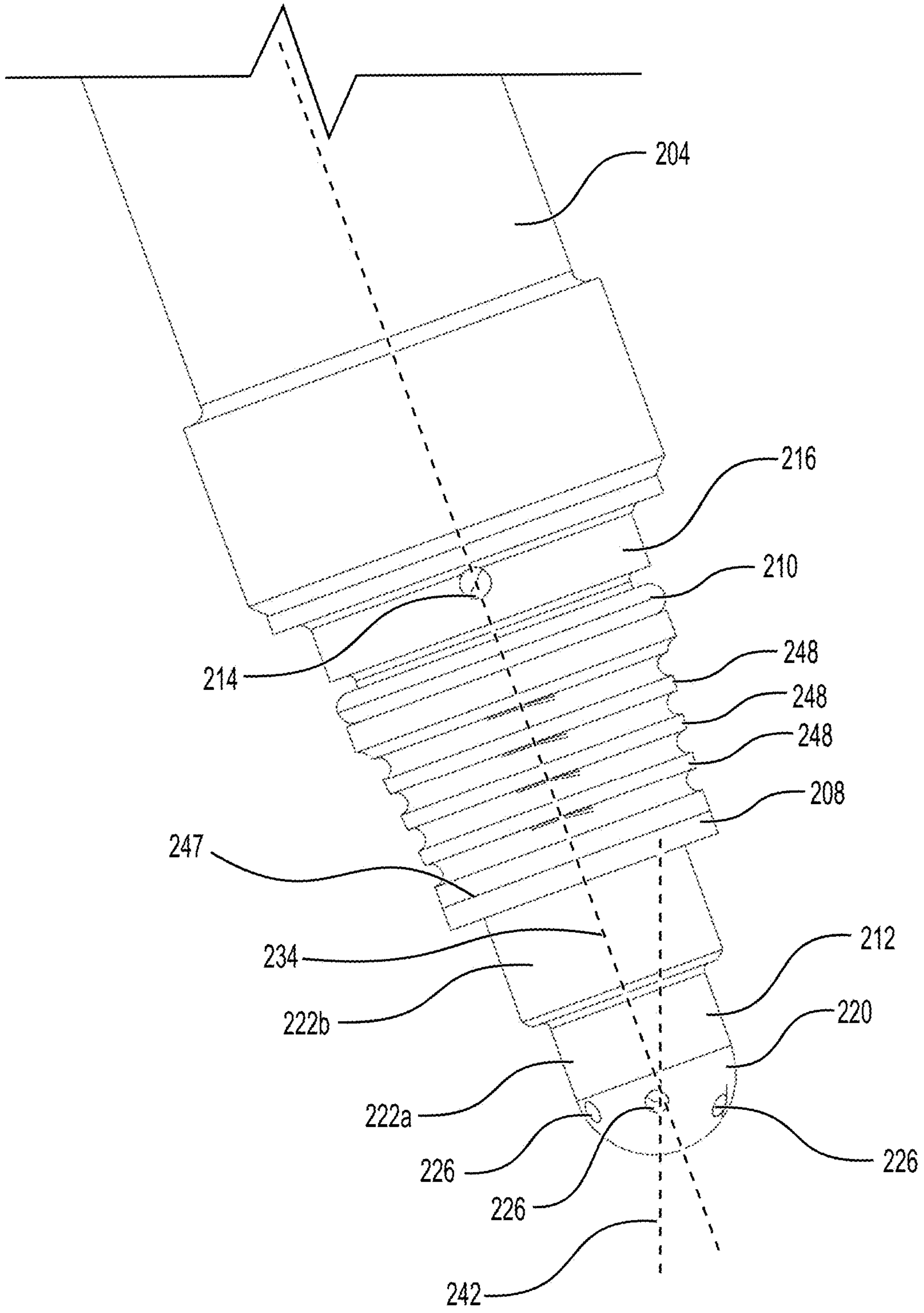
FIG. 14 is a close-up view of a lower end of the spark plug assembly of FIG. 11 taken from another side of the spark plug assembly.

The orifices 226 are defined in the tip 220 and extend from the hemispherical portion 230 of the combustion pre-chamber 224. As can be seen in FIG. 14, the orifices 226 are disposed about a central axis 242. As can be seen in FIG. 13, the orifices 226 extend at an angle relative to the central axis 242. In the present embodiment, the central axis 242 is coaxial with the cylinder axis 240. It is contemplated that in some embodiments, the central axis 242 could be parallel to the cylinder axis 240. It is also contemplated that in some embodiments, the central axis 242 could be at an angle relative to the cylinder axis 240. As in the present embodiment the central axis 242 is coaxial with the cylinder axis 240, the central axis 242 is angled relative to the axes 234, 236, 238.

With reference to FIG. 10, for each combustion chamber 32, the cylinder head 16 defines a bore 244 and a seat 246 to receive the spark plug assembly 200. The coolant jacket 58 passes between the bore 244 and the seat 246. The lower portion of the spark plug tube 204 is received in and screwed into the bore 244. The top end portion 216 of the housing 212 is received in the bore 244. The seal 210 is disposed radially between the top end portion 216 of the housing 212 and the side wall of the bore 244 to prevent coolant in the coolant jacket 58 from flowing into the upper portion of the cylinder head 16 containing the camshaft 46, cams 48 and valve actuation mechanisms 50, 52 and to prevent oil in the upper portion of the cylinder head 16 from flowing into the coolant jacket 58. The cylindrical portions 222*a*, 222*b* of the housing 212 are received in the seat 246 which has a shape corresponding to the shape of the cylindrical portions 222*a*, 222*b* of the housing 212.

The sealing ring 208 disposed around the cylindrical portion 222*b* and is compressed between a step 247 (FIG. 12) defined by the housing 212 and the cylinder head 16, specifically a lower wall of the coolant jacket 58. As such, a seal is formed by the sealing ring 208 around the seat 246 that prevents coolant from flowing from the coolant jacket 58 to the combustion chamber 32 and prevents air, fuel, and exhaust gases from flowing from the combustion chamber 32 to the coolant jacket 58.

To help ensure that the housing 212 is properly oriented in the seat 246 in order to have the orifices 226 properly oriented, the pin 214 is received in a notch (not shown) defined in the cylinder head 16. The top of the crown 206 of the spark plug assembly 200 is received in a recess defined in the valve cover 18. The top of the crown 206 abuts the valve cover 18, thereby providing a seal between the crown 206 and the valve cover 18.

As can be seen in FIG. 10, the housing 212 extends through the cooling jacket 58. As such, coolant flowing in the coolant jacket 58 cools the housing 212. To improve cooling, the portion of the housing 212 that is disposed in the coolant jacket 58 has ribs 248. It is contemplated that the ribs 248 could be omitted. The electrodes 227 of the spark plug 102 are aligned with the coolant jacket 58.

As can also be seen in FIG. 10, the housing 212 protrudes from the seat 246 into the combustion chamber 32. More specifically, the tip 220 and part of the cylindrical portion 222*a* extend into the combustion chamber 32 such that the orifices 226 open into the combustion chamber 32. For each combustion chamber 32, during operation of the engine 10, the fuel injector 54 injects fuel in the air intake passage 34 and, when the intake valves 40 open, air and fuel are supplied into the combustion chamber 32 from the air intake passage 34 thereby forming an air-fuel mixture in the combustion chamber 32. Part of the air-fuel mixture then flows from the combustion chamber 32 to the combustion pre-chamber 224 via the orifices 226. The spark plug 202 then ignites the part of the air-fuel mixture in the combustion pre-chamber 224. The ignited air-fuel mixture then flows from the combustion pre-chamber 224 to the combustion chamber 32 via the orifices 226. The ignited air-fuel mixture exits the orifices 226 as flame jets that ignite the air-fuel mixture in the combustion chamber 32. As such, the pre-chamber housing 212 creates multi-point ignition in the combustion chamber 32 using a single spark plug 202. The number of orifices 226, the angle between each orifice 226 and the central axis 242, and the angle between the orifices 226 and the diameter of the orifices 226 are selected depending on the desired ignition pattern in the combustion chamber 32. The exhaust gases resulting from the ignition of the air-fuel mixture in the combustion chamber 32 flow from the combustion chamber 32 to the exhaust passage 36 when the exhaust valves 44 open.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. An internal combustion engine comprising:
a cylinder block defining a cylinder;
a cylinder head connected to the cylinder block, the cylinder head defining a seat;
a piston disposed in the cylinder;
a crankshaft operatively connected to the piston,
the piston, cylinder and cylinder head defining a variable volume combustion chamber therebetween;
an air intake passage fluidly connected to the combustion chamber;
an exhaust passage fluidly connected to the combustion chamber;
a fuel injector fluidly connected to the combustion chamber for supplying fuel to the combustion chamber;
a combustion pre-chamber housing connected to the cylinder head and extending in part into the combustion chamber,
the combustion pre-chamber housing having:
a tapering portion; and
a tip connected to the tapering portion, the tapering portion abutting the seat of the cylinder head, the tapering portion tapering toward the tip,
the seat of the cylinder head and the tapering portion of the combustion pre-chamber housing having corresponding shapes,
the combustion pre-chamber housing defining:
a combustion pre-chamber; and
at least one orifice fluidly communicating the combustion pre-chamber with the combustion chamber,
fuel from the fuel injector being supplied outside of the combustion pre-chamber;
a spring biasing the tapering portion of the combustion pre-chamber housing against the seat of the cylinder head for sealing an interface between the tapering portion and the seat; and
a spark plug connected to the combustion pre-chamber housing;
during operation of the engine:
the air intake passage supplying air into the combustion chamber and the fuel injector supplying fuel into the combustion chamber to form an air-fuel mixture in the combustion chamber;
part of the air-fuel mixture flowing from the combustion chamber to the combustion pre-chamber via the at least one orifice;
the spark plug igniting the part of the air-fuel mixture in the combustion pre-chamber; and
the ignited air-fuel mixture flowing from the combustion pre-chamber to the combustion chamber via the at least one orifice to ignite the air-fuel mixture in the combustion chamber.

2. The internal combustion engine of claim 1, wherein:
the cylinder head defines a coolant jacket; and
the combustion pre-chamber housing extends through the coolant jacket.

3. The internal combustion engine of claim 2, wherein:
the combustion pre-chamber housing has an end portion; and
the tapering portion is disposed between the tip and the end portion; and
the internal combustion engine further comprises a seal disposed between the end portion and the cylinder head, the coolant jacket passing between the seal and the seat in the cylinder head.

4. The internal combustion engine of claim 2, wherein the combustion pre-chamber housing has ribs disposed in the coolant jacket.

5. The internal combustion engine of claim 1, further comprising a spark plug tube connected to the cylinder head; wherein:
the spark plug extends in the spark plug tube; and
the spring is disposed between the spark plug tube and the combustion pre-chamber housing.

6. The internal combustion engine of claim 5, wherein the spring is a disc spring.

7. The internal combustion engine of claim 5, wherein the spark plug is screwed into the combustion pre-chamber housing.

8. The internal combustion engine of claim 1, wherein:
the combustion pre-chamber has:
a frustoconical portion;
a hemispherical portion; and
a cylindrical portion extending between the frustoconical portion and the hemispherical portion; and
the at least one orifice extends from the hemispherical portion.

9. The internal combustion engine of claim 1, wherein the at least one orifice is defined in the tip.

10. The internal combustion engine of claim 1, wherein the at least one orifice is a plurality of orifices.

11. The internal combustion engine of claim 10, wherein the plurality of orifices is six orifices.

12. The internal combustion engine of claim 10, wherein:
the orifices of the plurality of orifices are disposed about a central axis; and
the orifices extend at an angle relative to the central axis.

13. The internal combustion engine of claim 12, wherein:
the cylinder defines a cylinder axis; and
the central axis is parallel to or coaxial with the cylinder axis.

14. The internal combustion engine of claim 13, wherein:
the combustion pre-chamber defines a pre-chamber axis; and
the pre-chamber axis is angled relative to the cylinder axis.

15. The internal combustion engine of claim 1, wherein:
the cylinder defines a cylinder axis;
the combustion pre-chamber defines a pre-chamber axis;
the spark plug defines a spark plug axis coaxial with the pre-chamber axis; and
the pre-chamber axis and spark plug axis are angled relative to the cylinder axis.

16. The internal combustion engine of claim 1, wherein the tip is hemispherical.

17. The internal combustion engine of claim 1, wherein the tapering portion of the combustion pre-chamber housing is frustoconical.

18. The internal combustion engine of claim 1, wherein the fuel injector supplies fuel in the air intake passage upstream of the combustion chamber.

* * * * *